(No Model.)
H. C. HICKS.
Stock Car.
No. 240,250. Patented April 19, 1881.
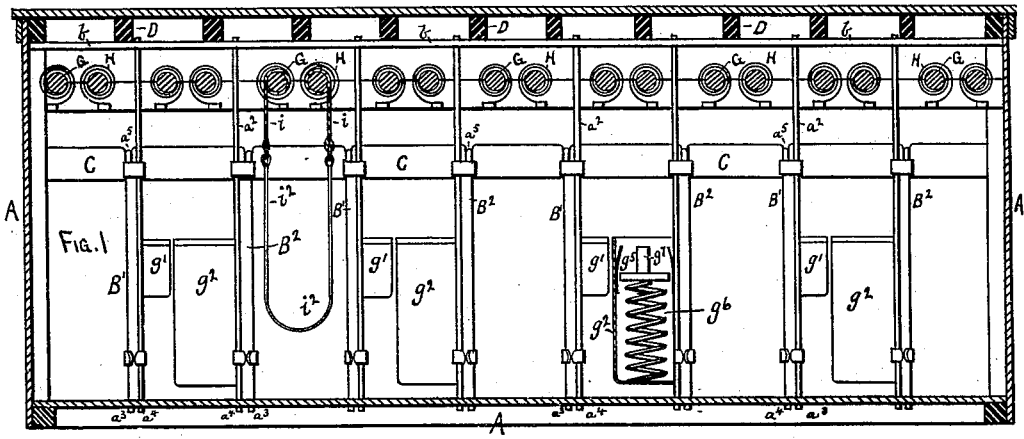
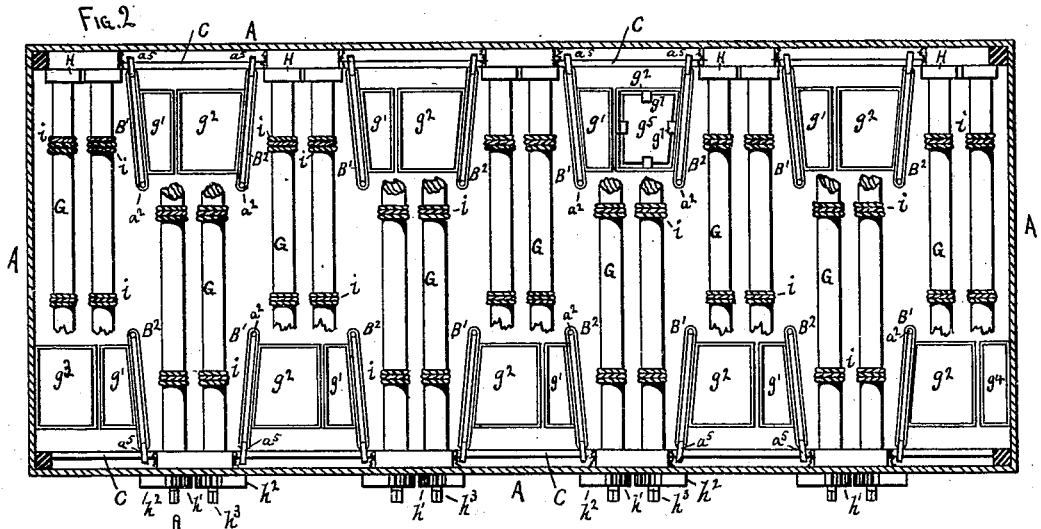
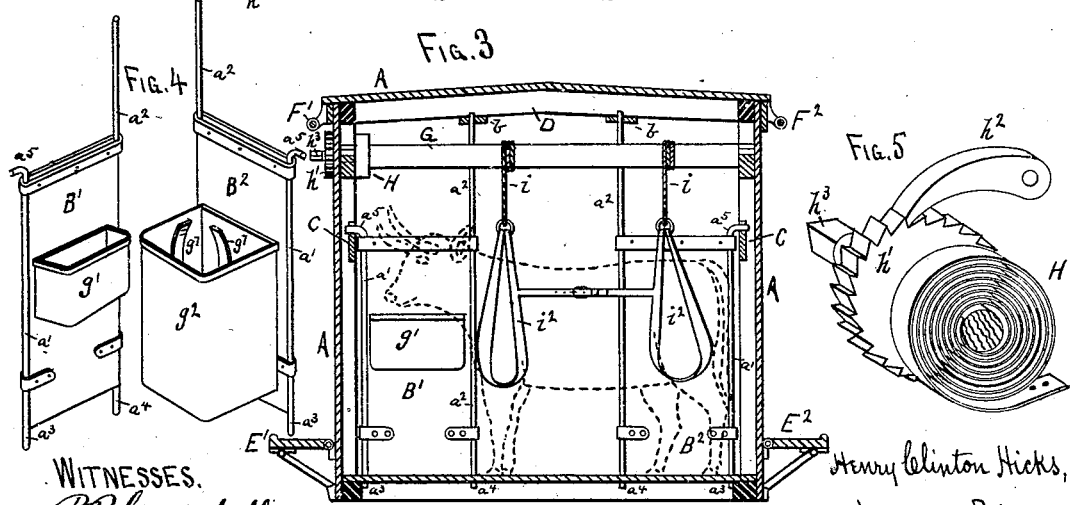
WITNESSES.
P. B. Crandall
Louis Feeser Jr.
Henry Clinton Hicks,
INVENTOR, BY
Louis Feeser & Leo
att'ys.

UNITED STATES PATENT OFFICE.

HENRY C. HICKS, OF MINNEAPOLIS, MINNESOTA.

STOCK-CAR.

SPECIFICATION forming part of Letters Patent No. 240,250, dated April 19, 1881.

Application filed January 11, 1881. (No model.)

*To all whom it may concern:*

Be it known that I, HENRY CLINTON HICKS, of Minneapolis, in the county of Hennepin and State of Minnesota, have invented certain Improvements in Stock-Cars, of which the following is a specification.

This invention relates to that class of cars for transporting live stock in which provision is made for feeding the animals while in transit; and it consists in a series of movable partitions for dividing the car into stalls or compartments and arranging upon said partitions feeding and watering apparatus, the feeding-troughs being provided with followers, and in one or more rollers or drums above each animal, to which slings or supporting harnesses are attached, so that the animals may be held up and prevented from falling or being thrown down, and providing each roller with a ratchet-wheel and pawl to enable the slings to be raised and lowered and held in any desired position, said rolls being provided with a coiled spring to keep the harness taut and to automatically wind up the roller, as hereinafter set forth. I accomplish these results by the use of the mechanism illustrated in the accompanying drawings, in which—

Figure I is a sectional side elevation. Fig. II is a sectional plan view of a portion of a car with my improvements attached thereto. Fig. III is a sectional end view. Fig. IV is a perspective view of a pair of the movable partitions detached; Fig. V, a perspective view of the end of one of the rollers, showing the manner of arranging the spring and ratchet.

A is the frame of the car, made in the ordinary manner, and $B'$ $B^2$ a series of partitions set at regular intervals along each side and dividing each side of the car into compartments or stalls, as shown. The edges of these partitions will be provided with rods $a'$ $a^2$, with projecting lower ends, $a^3$ $a^4$, set into sockets in the floor of the car, while the upper ends of the rod $a'$ are turned off at right angles or hooks $a^5$, and set into slots in the strips C, forming part of the frame of the car, and the upper ends of the rods $a^2$ project upward through strips $b$ $b$, secured to the under side of the deck-timbers D. By this arrangement if the partitions are raised up until the pivots $a^3$ $a^4$ and hooks $a^5$ are released from the floor and strips C, they may be turned to one side until the rods $a^2$ are free from the strips $b$ $b$, and readily removed from the car or replaced in the same manner.

It will be observed that the partitions $B'$ $B^2$ are arranged in pairs $a'$ $a^2$, with their inner ends closer together than their outer ends, and that each pair on one side are opposite the spaces between the pairs on the other side, whereby the stalls are formed with one end decreasing in width and the other end increasing in width, so that when the cattle are placed in the cars with the head of each alternate one opposite the tail of the next one, each animal will have his head in the space between the partitions, and thus have more room for feeding.

$g'$ are feed-boxes, and $g^2$ watering-troughs, secured to the partitions $B'$ $B^2$, as shown, and adapted to be removed with them, the end boxes $g^3$ $g^4$ being secured to the ends of the car.

$E'$ $E^2$ are foot-boards, hinged to the car along each side near the bottom, so that they may be folded up or down when not in use, upon which the attendant walks when feeding the stock, hand-rods $F'$ $F^2$ being arranged along the sides near the top to support him when engaged in that duty.

Above each of the stalls rollers G are arranged, running across the car just beneath the deck, and provided on the outside of one or both ends with ratchet-wheels $h'$, pawls $h^2$, and square heads or hand-wheels $h^3$, whereby the rollers may be revolved and held in any desired position. Suspended from these rollers are ropes or chains $i'$, connected to slings $i^2$, adapted to pass around the animals, as shown in Fig. III, to support them and prevent them from falling or being thrown down, the adjustment of the rollers G by the ratchets $h'$ $h^2$ $h^3$ permitting the slings to be adapted to different-sized animals. Another advantage of the rollers is that, should an animal become thrown or lie down before the harness is placed upon it, the rollers could be used to raise him.

H H are coiled springs connecting the rollers G to the side of the car, so that should it be desired to allow an animal to lie down the pawl $h^2$ will be thrown off from the ratchet-wheel $h'$, and the springs H wound up by the weight of the animal in lying down, and then when he rises the pawl will be returned to its place and the springs will revolve the rollers and draw the sling up taut and prevent its becoming disarranged, and the rollers will be caught by the ratchet and pawl as fast as wound up and held, and thus prevent the animal again lying down or falling when partially risen.

In the feed-boxes $g'$ followers $g^5$ will be arranged and provided with springs $g^6$, so that the hay, &c., will be kept up near the top to enable the animals to reach it without inserting their noses far into the box, and fingers or retarders $g^7$ will be arranged at the upper part to keep the hay from being thrown out by the follower.

When the car is to be loaded all the partitions B' B² are removed and one animal driven in and placed with his head toward the end feed-box, $g^4$. The first two opposite partitions are then set up and another animal driven in and placed with his head in the opposite direction from the other, and so on until the car is filled, the slings $i^2$ being placed upon each animal when the partitions are set up. The animals may be put in from one or both ends or from the center, as may be desired.

The sides of the car will be made open, as usual, so that a free circulation of air is obtained, and by removing the partitions the car may be readily cleaned.

What I claim as new is—

1. The partitions B' B², provided with the pivots $a^3$ $a^4$, hooks $a^5$, and extension-rod $a^2$, whereby they may be readily removed or inserted into the car, substantially as set forth.

2. The combination and arrangement of the rollers G, slings $i'$ $i^2$, and springs H, substantially as set forth.

3. The combination, with the partitions B' B², provided with the pivots $a^3$ $a^4$, hooks $a^5$, and extension-rods $a^2$, of the feed-receptacles $g'$, having the spring-followers $g^5$ $g^6$ and retarding-fingers $g^7$, substantially as set forth.

In testimony whereof I have hereunto set my hand in the presence of two subscribing witnesses.

HENRY CLINTON HICKS.

Witnesses:
C. N. WOODWARD,
LOUIS FEESER.